United States Patent [19]

Otrhalek et al.

[11] 4,154,725

[45] May 15, 1979

[54] METHOD OF RECOVERING TALL OIL FROM ACIDULATION OF RAW TALL OIL SOAP

[75] Inventors: Joseph V. Otrhalek, Dearborn; Gilbert S. Gomes, Southgate; Gunther H. Elfers, Grosse Ile, all of Mich.

[73] Assignee: BASF Wyandotte Corporation, Wyandotte, Mich.

[21] Appl. No.: 879,076

[22] Filed: Feb. 21, 1978

[51] Int. Cl.² ............................................. D21C 11/00
[52] U.S. Cl. .................................. 260/97.7; 162/16; 260/97.6; 526/317
[58] Field of Search ............................ 260/97.7, 97.6; 526/317

[56] References Cited

U.S. PATENT DOCUMENTS

| | | | |
|---|---|---|---|
| 3,873,417 | 3/1975 | Otrhalek et al. | 260/17.4 R |
| 3,880,704 | 4/1975 | Ziegler et al. | 260/97.7 |
| 3,965,085 | 6/1976 | Holinbom et al. | 260/97.7 |
| 4,075,188 | 2/1978 | Vardell | 260/97.7 |

*Primary Examiner*—H. S. Cockeram
*Attorney, Agent, or Firm*—John W. Linkhauer; Bernhard R. Swick; Robert E. Dunn

[57] ABSTRACT

A free-radical prepolymer, disclosed in U.S. Pat. No. 3,873,417 as being a dispersant, when added at 10 to 500 parts per million to a reaction mixture in which raw tall oil soap is acidulated to obtain tall oil, is found to act as a separating agent and increase the quantity of tall oil recovered.

8 Claims, No Drawings

METHOD OF RECOVERING TALL OIL FROM ACIDULATION OF RAW TALL OIL SOAP

BACKGROUND OF THE INVENTION

1. Field of the Invention

This invention relates to the recovery of tall oil from the alkaline pulping of wood from coniferous trees, and in particular, it relates to a method for improving the recovery of tall oil in the step of the process in which tall-oil soap is acidulated to obtain tall oil.

2. Description of the Prior Art

It is known that in the kraft or sulfate pulping process, tall oil can be recovered as a major by-product. Particularly in the pulping of pine or Douglas fir, tall oil, in the form of its sodium salt, is present in the relief liquors which are drawn from the digester. From these relief liquors, also called black liquor, some water is evaporated, and then the liquor is transferred to a skimming tank. The tall-oil soap tends to rise to the surface, and it can readily be skimmed off. A certain amount of tall oil soap can be recovered in that way without further effort. Additional tall-oil soap remains in the black liquor, and the invention of copending application Ser. No. 759,070, filed Jan. 13, 1977 and now U.S. Pat. No. 4,085,000, is concerned with how the recovery of the remaining tall-oil soap can be achieved. In accordance with that invention, an improvement in the recovery of the tall-oil soap is achieved by adding a small but effective amount of a terpolymer having a composition as defined in U.S. Pat. No. 3,873,417.

The usual next step in the recovery of tall oil is the acidulation step, a step in which the recovered tall-oil soap is treated with sulfuric acid to convert the soap to the free-acid form. As was the case with the tall-oil soap, a certain amount of tall oil can be recovered without taking any additional steps; this invention is concerned with how the recovery of additional tall oil from the acidulation mixture can be achieved.

SUMMARY OF THE INVENTION

It has now been found that by the addition of small amounts of terpolymers of unsaturated carboxylic acids, esters of unsaturated carboxylic acids, and allyl alcohol, there may be obtained a substantial increase in the efficiency of the process of recovering tall oil from the reaction mixture of the acidulating step in a pulping process. The finding is surprising and unexpected, since such polymers were originally known for their properties as dispersants, whereas, in contrast, in this case a phase separation is achieved. The mechanism of the separation of the crude tall oil in the presence of the terpolymers used in accordance with the present invention is not well understood, but it yields a commercially valuable result.

DESCRIPTION OF THE PREFERRED EMBODIMENTS

The terpolymer according to the present invention is an alkali-neutralized, free-radical-polymerized polymer made up of units derived from (1) an alpha-beta-unsaturated acid, (2) an alkylate of an alpha-beta-unsaturated acid, and (3) allyl alcohol. More particularly, the acid is an alpha-beta-unsaturated acid, and it contains 3 to 4 carbon atoms. Included within this group of acids are acrylic acid, methacrylic acid, crotonic acid, and isocrotonic acid, with the first two acids being preferred. The amount of acid employed in preparing the terpolymer of this invention, on the basis of a total of 100 parts by weight, is from about 60 to about 88 parts by weight, and preferably, from about 75 to about 88 parts by weight.

The alkylate units contained in the terpolymer of this invention are esters of the acids mentioned above. Again, the preferred acids are acrylic acid and methacrylic acid. The alkyl portion of the alkylate monomer contains from 1 to 18 carbon atoms, and more preferably, from 1 to 10 carbon atoms. Linear or normal alkyl, branched alkyl, hydroxy alkyl, or cycloalkyl radicals may be used. Illustrative of the alkyl groups used are methyl, hydroxymethyl, ethyl, hydroxyethyl, propyl, isopropyl, butyl, 2-ethylhexyl, cyclohexyl, nonyl, octyl, dodecyl and stearyl. On the basis of 100 parts by weight of the terpolymer, alkylated acid is present in the terpolymer in an amount from about 6 to about 28 parts, and preferably, from about 6 to about 15 parts.

The third component in the terpolymer is allyl alcohol, which is present, based on 100 parts, in an amount from about 4.5 parts to about 20 parts, and preferably from about 6 to about 15 parts by weight.

The terpolymers are prepared by free-radical polymerization in an aqueous medium at a temperature of from just above the freezing point up to the reflux temperature of the aqueous reaction mixture. More practical operating temperatures are in the range of about 50° C. to about 100° C., with a range of about 60° C. to about 90° C. being particularly preferred. Polymerization in accordance with this invention may be conducted at atmospheric pressure, or at a higher (autogenous) pressure.

The polymerization is generally conducted for a period of two to eight hours, a period of three to five hours being very satisfactory. The foregoing details, the initiators discussed below, and other similar details are well known to those skilled in the polymer art, and for the sake of brevity they need not be discussed further.

It has been found preferable to prepare an aqueous solution of acid, ester, and alcohol, and then charge the solution incrementally to the reaction vessel, along with incremental additions of an aqueous solution of the initiators, at such a rate so as to maintain the desired reaction temperature evenly. The solids content of the reaction system may range from about 20 to about 50 percent by weight. Thirty percent by weight has been found very satisfactory from the point of view of obtaining a viscosity low enough to permit easy handling of the resulting polymer solution.

Any of the compounds known to generate free radicals and which are soluble at effective concentrations in the aqueous polymerization medium may be used as the polymerization initiator or initiators in practicing this invention. Examples of useful polymerization initiators include the alkali-metal and ammonium persulfates, perborates, or percarbonates; hydrogen peroxide; organic peroxides such as benzoyl peroxide, cumene hydroperoxide, tertiary butyl peroxide, tertiary butyl perbenzoate, acetyl benzoyl peroxide; tertiary butyl peracetate; and tertiary butyl peroxyisobutyrate. Ammonium, potassium, and sodium persulfates are particularly preferred. Organic peroxides may be used in combination with these inorganic peroxidic catalysts. Azonitrile compounds, such as those described in U.S. Pat. No. 2,472,959, may be used also.

Generally, the proportion of polymerization initiator is in the range of 0.1% to 8.0%, based on the weight of the acid plus alkylate charged, and preferably from 1% to 3%, the foregoing percentages being by weight.

The initiator may also be a peroxidic catalyst activated with a reducing agent to provide a redox system. Examples of useful reducing agents include water-soluble bisulfites, such as sodium metabisulfite; sulfites; hydrosulfites; and thiosulfates. The redox system may be further activated by the presence of polyvalent metal ions, for example, ferrous ions at concentrations on the order of magnitude of several parts per million, or with tertiary amines which are soluble in the reaction mixture.

The proportion of reducing agent included in the polymerization-initiator combination ordinarily ranges up to 3%, based on the weight of the monomers, and it is preferably in the range of 0.02% to 1% on this basis. In the inorganic redox system of persulfate and bisulfite, the weight ratio can vary from one to ten parts of persulfate per part by weight of bisulfite.

The polymerization product has an acidic pH and can be neutralized with alkaline materials, such as ammonia or ammonium hydroxide; monoalkylamines or dialkylamines containing 1 to 6 carbon atoms in each alkyl group; and alkali-metal hydroxides, for example, potassium hydroxide or sodium hydroxide, that form water-soluble neutralization products. Preferably, the neutralizing agent will be ammonia, ammonium hydroxide, potassium hydroxide, or sodium hydroxide. The neutralizing agent is added to the polymer solution until a final pH of about 7.5 to about 8.5 is obtained. Thus neutralized, the polymer solution has improved storage stability, and possible metal-corrosion problems in a storage container are minimized.

The resulting polymer solution is adjusted, as necessary, to have a total solids content of polymer of between about 20 and about 50 weight percent. Using a lower solids content gives a material of lower viscosity, which may prove to be of advantage in improving the handling characteristics; on the other hand, it is usually desirable to use a solids content as high as possible, to avoid the cost of shipping and handling water.

After having been prepared as described above, the terpolymer is used in a suitable way. It may be added to the reaction mixture of the acidulation step in some amount such as 10 to 500 parts by weight per 1,000,000 parts by weight of such reaction mixture. Usually the terpolymer is added to liquor resulting from the pulping of Douglas fir or pine, inasmuch as these are soft wood (coniferous) trees, which are commercially available and which contain in their wood a considerable proportion of oil, but the invention is not necessarily limited to the treatment of liquors from the pulping of these woods. Wood from other conifers also contains resin or oil. Indeed, even the hardwoods contain such resin or oil in a small proportion, and it may be desirable in some cases to use a terpolymer according to the present invention to improve the recovery of tall oil from a liquor resulting from pulping of a hardwood. The following Examples are included to illustrate the preparation of the terpolymers of the present invention and the use thereof, but the Examples are to be interpreted as illustrative, and not in a limiting sense. Unless otherwise noted, all parts are by weight, and all temperatures are in degrees Centigrade.

EXAMPLE 1

A one-liter, three-necked flask equipped with stirrer, thermometer, addition funnels, reflux condenser, and heat-exchange equipment was charged with 236 grams of water. A mixture of 207 grams of acrylic acid, 23 grams of butyl acrylate, and 11.5 grams of allyl alcohol (solution I) and 115 grams of an aqueous solution containing 6% of potassium persulfate (solution II) was added concurrently to the water at 80° to 85° C. over three and a half hours.

The reaction product was then neutralized with 175 grams of an aqueous solution containing 28 weight percent of ammonia. A clear viscous solution was obtained, which showed a Brookfield viscosity of 1,800 centipoises. When used as indicated below in Example 5, the product was effective as an aid for improving the recovery of tall oil in a step of acidulating tall-oil soap.

EXAMPLE 2

A five-liter, three-necked flask equipped with stirrer, thermometer, addition funnels, reflux condenser, and heat-exchange equipment was charged with 1,230 grams of water. A mixture of 1.035 grams of acrylic acid, 115 grams of butyl acrylate, and 115 grams of allyl alcohol (solution I) and 575 grams of an aqueous solution containing 6% of potassium persulfate (solution II) was added concurrently to the water at 80° to 85° C. over a period of three hours. The reaction product was then neutralized with 1,150 grams of an aqueous solution containing 50% of sodium hydroxide. A clear solution having a total active solids content of 30% was obtained. It exhibited a PH of 7.7, and Brookfield viscosity of 3,040 centipoises (Spindle No. 4, 60 revolutions per minute), and a density of 1.25 grams per cubic centimeter. When used as indicated below in Example 5, the product was effective as an aid for improving the recovery of tall oil in a step of acidulating tall-oil soap.

EXAMPLE 3

Following the procedure of Example 1, there was prepared a terpolymer which was based on 82 parts of acrylic acid, 9 parts of methyl methacrylate, and 9 parts of allyl alcohol. The total solids content of the polymer solution was 30% and the solution was neutralized with an aqueous solution containing 50% of sodium hydroxide. The solution had a viscosity of 2,560 centipoises. When used as indicated below in Example 5, the product was effective as an aid for improving the recovery of tall oil in a step of acidulating tall-oil soap.

EXAMPLE 4

Following again the procedure of Example 1, there was prepared a terpolymer based on 64 parts of acrylic acid, 27 parts of hydroxyethyl methacrylate, and 9 parts of allyl alcohol. The total solids content of the polymer solution was 30%, and neutralization was conducted as in Example 3. There was thus obtained a solution having a Brookfield viscosity of 2,648 centipoises. When used as indicated below in Example 5, the product was effective as an aid for improving the recovery of tall oil in a step of acidulating tall-oil soap.

EXAMPLE 5

This example demonstrates the effective use of the product as a tall-oil acidulation aid. The product of Example 2 was added at concentrations ranging from 10 to 75 parts per million of tall-oil soap skimmings from a pulp mill. The samples were treated with sulfuric acid to a pH of 1.5 and heated at 90° C. for one hour. The amount of tall oil separated was then observed. The results tabulated below indicate an increase in tall-oil separation at addition levels as low as 10 parts per million, and that the effectiveness of the treatment increases when higher concentrations of terpolymer are used.

Effectiveness of Tall Oil Acidulation Additive
(Product of Example 2)

| Concentration of Additive, ppm | Amount of Tall Oil Separated, mm | Additional Tall Oil Separated, % |
|---|---|---|
| None (Control) | 18 | 0 |
| 10 | 21 | 17 |
| 20 | 22 | 22 |
| 35 | 23 | 28 |
| 50 | 25 | 38 |
| 75 | 26 | 44 |

While we have shown and described herein certain embodiments of our invention, we intend to cover as well any change or modification therein which may be made without departing from its spirit and scope.

The embodiments of the invention in which an exclusive property or privilege is claimed are defined as follows:

1. A method of recovering tall oil from an acidulation step in which tall-oil soap is reacted with sulfuric acid, said method comprising mixing with said reaction mixture about 100 to 500 parts by weight, per one million parts by weight of said reaction mixture, of a terpolymer consisting essentially of units which are:
   (a) about 60 to about 88 parts by weight from an alpha-beta—unsaturated acid containing 3 to 4 carbon atoms,
   (b) about 6 to about 28 parts by weight from an alkylate of an alpha-beta—unsaturated acid containing 3 to 4 carbon atoms, the alkyl portion of said alkylate containing from 1 to 18 carbon atoms, and
   (c) about 4.5 to about 20 parts by weight from allyl alcohol.

2. A method as defined in claim 1, wherein said terpolymer consists essentially of units which are:
   (a) about 75 to about 88 parts by weight from an alpha-beta—unsaturated acid containing 3 to 4 carbon atoms,
   (b) about 6 to about 15 parts by weight from an alkylate of an alpha-beta—unsaturated acid containing 3 to 4 carbon atoms, the alkyl portion of said alkylate containing from 1 to 18 carbon atoms, and
   (c) about 6 to about 15 parts by weight from allyl alcohol.

3. A method as defined in claim 2, wherein said alpha-beta—unsaturated acid containing 3 to 4 carbon atoms is one selected from the group consisting of acrylic acid, methacrylic acid, crotonic acid, and isocrotonic acid.

4. A method as defined in claim 3 wherein said alpha-beta—unsaturated acid is acrylic acid.

5. A method as defined in claim 1 wherein said acrylate has an alkyl portion containing 1 to 10 carbon atoms.

6. A method as defined in claim 5 wherein said terpolymer consists essentially of units which are:
   (a) about 75 to about 88 parts by weight from an alpha-beta—unsaturated acid containing 3 to 4 carbon atoms,
   (b) about 6 to about 15 parts by weight from an alkylate of an alpha-beta—unsaturated acid containing 3 to 4 carbon atoms, and
   (c) about 4.5 to about 20 parts by weight from allyl alcohol.

7. A method as defined in claim 6, wherein said alpha-beta—unsaturated acid containing 3 to 4 carbon atoms is one selected from the group consisting of acrylic acid, methacrylic acid, crotonic acid, and isocrotonic acid.

8. A method as defined in claim 7, wherein said alpha-beta—unsaturated acid is acrylic acid.

* * * * *